Patented Aug. 14, 1945

2,382,282

UNITED STATES PATENT OFFICE 2,382,282

SELENIUM RUBY GLASS

Chester R. Austin and John D. Sullivan, Columbus, Ohio, assignors to Battelle Memorial Institute, Columbus, Ohio, a corporation of Ohio No Drawing. Application November 5, 1942,
Serial No. 464,660

4 Claims. (Cl. 106—52)

Our invention relates to selenium ruby glass. It has to do, particularly, with selenium ruby glass made from a cheap base glass, although it is not necessarily limited thereto.

This application is a continuation-in-part of our copending application Serial No. 357,156, filed September 17, 1940, now Patent No. 2,309,070.

In the prior art practice, selenium and cadmium sulfide are normally used in the making of ruby glass. The base glasses usually contain appreciable amounts of zinc oxide. The base glass may be melted by batch or continuous methods, but the ruby glasses are ordinarily melted in pots by the batch process.

In batch melting, the glass forming ingredients are normally placed in a refractory pot, melted and "fined." The "fining" operation allows included gases to escape from the melt and homogenizes the glass. Following "fining," the glass is ready for forming operations.

In continuous melting practice, the glass-forming ingredients are more or less continuously fed into the melting end of a glass tank. On melting, the glass flows through a throat in a partition in the tank into the "fining" end of the tank where the glass is freed of gas bubbles and is homogenized. The "fined" glass flows into a forehearth adjacent the melting tank, from which it may be withdrawn as desired for forming operations.

Selenium-containing glasses, as formed at present, are not ruby-colored but are colorless or amber-colored. The formed ware is then reheated to bring out the desired ruby color. Because the time and temperature of reheating as well as the thickness of the glass sections affect the intensity of the ruby color, the percentage of "rejects" is large. There is a need in the art for a better method of making ruby glass.

In the prior art, also, the suggestion has been made that the selenium ruby color might be developed in certain glass batches as they are melted in the pot by adding certain ingredients to the batch, for example, elemental cadmium, cadmium selenide or cadmium sulfo-selenide. While it has been claimed that these additions to certain glass batches would insure the production of a ruby glass as drawn from the pot, this method has not been used successfully in a commercial way.

One of the objects of our invention is to provide a selenium ruby glass wherein the ruby color of the glass may be controlled as to uniformity and as to degree and whereby glass products or articles may be formed therefrom of uniform ruby coloring and of any desirable depth of coloring.

Another object of this invention is to provide a ruby glass which can be produced by a method which will be more simple than methods known in the prior art.

Still another object of this invention is to produce glassware which will be of a uniform and reproducible ruby color.

A further object of this invention is to provide a ruby glass of such a nature that it is possible to bring about economy in heating and handling in the making of it and it is possible to utilize mass production methods in a more effective way in making it.

As a result of considerable investigation, we have found that it is possible to produce a ruby color in a cheap base glass prior to the forming operation. Thus, we have been able to obtain uniform results in producing ruby-colored ware. The ruby glass of our invention is preferably prepared by a method which includes a novel heat treatment, which may be termed "arrested cooling" and which is preferably given the glass as it cools from the "liquid" state. The glass is melted and "fined" by either batch or continuous methods, as previously indicated. The "liquid" glass is withdrawn from the pot or tank and held for a definite period at a predetermined temperature to permit the color to develop before pressing or otherwise forming. The specific operating conditions will be subsequently described. Thus, after forming, it is only necessary to perform the usual annealing operation. Since the ware is formed from the glass which already has a ruby color and wherein the color is uniform throughout, the number of "rejects" because of faulty coloration is very low. The process is equally applicable to batch and to continuous melting processes.

Preferably, ordinary soda-lime-silica types of glass are used, though various minor additions such as carbon, boric acid and sodium sulfate may be made. Other minor additions may be made, as is known to those skilled in the art, without departing from the scope of this invention. The usual range of base glass composition which may be used in this invention is about as follows:

| Ingredient | Weight, per cent |
|---|---|
| $SiO_2$ | 69–74 |
| $Al_2O_3$ | 1–4 |
| $Na_2O$ $K_2O$ | 13–16 |
| $CaO$ $MgO$ | 7–13 |

The alumina content appears important to the practice of this invention and such content should not be below about 1% for best results. As the alumina content is decreased the time required for the arrested cooling step becomes increasingly long. Increasing alumina decreases this time but at the expense of producing a more pasty and difficultly workable glass. For practical purposes 4% of alumina constitutes about the maximum amount which may be used, although we do not desire to be limited to such percentage. The alkali oxides and alkaline earth oxides may be varied about as shown above, the chief precaution being that they do not fall far outside the ranges which have been found to be best in ordinary glass manufacture. Minor substitutions and changes in the above listed composition may be made as long as the character of the glass is not radically changed. Zinc oxide in amounts of 1% or over has been found somewhat detrimental to the development of ruby color in accordance with this invention, although we do not desire to be limited to such a percentage.

To a base glass of the type described above, cadmium sulfide and selenium are added to produce the desired ruby color. The actual amounts of each which are added are dependent on the particular ruby shade which is desired, the type and thickness of the ware being produced, the type of furnace and the methods of glass production employed, and the various techniques involved in the forming of the ware. These ingredients may be added to the raw batch in about equal amounts up to 1% of each. 1% cadmium sulfide includes 0.78% cadmium and 0.22% sulfur. Good results have been obtained with the addition of about 0.6% of selenium and 0.6% of cadmium sulfide. The actual selenium in the final glass may be much lower because of volatilization and other losses. It has been found that only 0.03 to 0.06% selenium in the final glass is sufficient to produce selenium ruby glass. A high soda content in the base glass increases the amount of selenium required to produce a given color. It is preferred that the addition agents be added to the batch in such amounts that the final glass contains at least 0.03% selenium, 0.02% cadmium, 0.01% sulfur and 1% alumina. Thus, it is preferred that in the final glass there will be present selenium in amounts ranging from 0.03 to 1%, cadmium in amounts ranging from 0.02 to 0.78%, sulfur in amounts ranging from 0.01 to 0.22% and alumina ranging from 1% to 4%.

The glass-forming ingredients, that is, base glass plus selenium and cadmium sulfide are melted by either batch or continuous methods. However, it is desirable that the atmosphere surrounding the glass batch should be a reducing atmosphere, or at least an atmosphere which is not strongly oxidizing, during the melting operation. Our tests to date indicate that, if the atmosphere is too strongly oxidizing during the melting operation, the ruby color cannot be satisfactorily developed in the subsequent steps of this process, unless an unduly large amount of colorants is used. A combustion atmosphere produced from natural gas and air under conditions that it contains 2% to 5% of CO and no free $O_2$ has been found to be satisfactory. The fusing temperature which is preferably used for a glass batch of the desired type is about 2600° to 2700° F.

After melting and "fining" the glass is preferably allowed to cool to about 1800° to 2300° F. and is preferably held at this temperature until used in the succeeding steps of delivery, formation, et cetera. In the batch operation, this holding may be effected in the pot, while in the continuous operation, it may be accomplished in the "fining" end of the melting tank or in a feeder or forehearth from which the glass is ultimately delivered to the forming apparatus.

In general, if the glass is held at temperatures above 2300° F., it fails to develop the desired ruby color following the subsequent steps. Instead, it remains an amber color. On the other hand, if this holding temperature is much below 1800° F., the glass becomes opaque rather than the desired clear ruby. So far as the selenium content is concerned, our tests show that the higher the selenium content, the higher this holding temperature may be.

After the glass reaches a temperature ranging from 1800° to 2300° F., it is subjected to that portion of this process which has been called the "arrested cooling" phase. In this phase, the glass is placed, for a length of time dependent upon the temperature used, in a heated zone which is maintained at a temperature of 1400° to 2100° F. It should be noted that the glass does not necessarily reach the temperature of this holding zone but is merely held in this zone for a sufficient time to permit the development of the desired ruby color. The temperature of this holding zone is preferably never higher than the original holding temperature. The time period of this arrested cooling of the glass in this zone is directly related to the temperature used, that is, the higher the temperature, the longer the time required for the color development. At 1400° F., only 5 or 10 seconds are required, while at 2100° F., a minute is required, these figures being merely illustrative. Our tests indicate that above 2100° F., in the arrested cooling zone, it is not possible to cause the color to develop while below 1400° F., the time becomes so short as to be quite difficult to control, if a ruby color is produced at all. In addition, there is a tendency for the glass to cool below the forming temperature. It is important to hold the glass at such a temperature in the arrested cooling zone that forming can take place immediately on withdrawal of the glass from the zone.

After this arrested-cooling treatment has been applied the desired ruby color has been developed uniformly throughout the glass. The ware produced from this glass by forming operations at the conclusion of this process will be uniform in color and does not require a color-striking operation. Of course, the usual stress-relieving anneal must be given the ware. Because the color is developed in the glass mass prior to forming, rather than in the formed ware, sections of varying thickness may be produced with a uniform color, and a given piece of ware is easily reproducible.

The exact mechanism of the coloring of glass by selenium and cadmium sulfide by the prior art method and by the method described herein is not fully understood. However, the following is suggested as a possible explanation, without restricting our invention to these hypotheses. In the prior art method of producing ruby glass by "color-striking" operations, the color is in solution in the glass as fused and as formed. The color-striking operation produces a precipitation of fine particles of the solid colorant which causes the ruby color. In the present invention, the color is present in solution in the glass melt, as in the prior art, but during the arrested cooling of this invention, the colored particles are caused to precipitate in the glass prior to the forming of glass articles therefrom and the ruby color is thereby imparted and insured in the glass mass.

By carrying on this color development at a suitably elevated temperature, forming of the colored glass can be accomplished while the glass is still pyroplastic. When conditions are such that an insufficient number of particles are precipitated, or the size of the particles is not right, the resultant glass is merely amber in color. On the other hand, if too many particles are precipitated or if these particles are too large, the glass is cloudy or opaque. While these hypotheses may not be entirely correct, they offer a possible explanation of the phenomena which have been observed.

It will be seen that we have produced a ruby glass that will be uniform in color and that can be formed into products or articles which will also have uniform coloration. It will likewise be apparent that we have provided ruby glass that can be made by a method which will obviate the necessity of using a special step of reheating the glass articles or products after they are formed. It will likewise be evident that we have produced a ruby glass that can be made by a method which not only is simple but which will bring about economy in the handling and making of the ruby glass. The ruby glass can be made by the utilization of mass production methods. It will likewise be seen that control of the ruby color of the glass as to uniformity and degree or depth of coloring is possible.

Having thus described our invention, what we claim is:

1. A selenium ruby glass containing 69 to 74% $SiO_2$, 13 to 16% $Na_2O+K_2O$, 7 to 13% $CaO+MgO$, 1 to 4% $Al_2O_3$, less than 1% of ZnO, at least 0.03% selenium, cadmium in effective amounts up to .78% and sulfur in effective amounts up to .22%.

2. A batch mixture for forming a selenium ruby glass containing the glass-forming ingredients in amounts which upon melting will result in a glass containing 69 to 74% $SiO_2$, 13 to 16% $Na_2O+K_2O$, 7 to 13% $CaO+MgO$, 1 to 4% $Al_2O_3$, and less than 1% ZnO, said glass batch also containing selenium in amounts up to 1% and cadmium sulfide in amounts up to 1%.

3. A selenium ruby glass having a soda-lime-silica base and containing from 1% to 4% alumina, less than 1% of zinc oxide, from 0.03% to 1% selenium, from 0.02% to 0.78% cadmium, and from 0.01 to 0.22% sulfur.

4. A batch mixture for forming a selenium ruby glass having a soda-lime-silica base and containing from 0.03% to 1% selenium, cadmium sulfide in amounts effective, in conjunction with the selenium, to produce a ruby color but not in excess of 1%, and from 1% to 4% alumina, and less than 1% of zinc oxide.

CHESTER R. AUSTIN.
JOHN D. SULLIVAN.